(12) United States Patent
Sreejith et al.

(10) Patent No.: US 7,742,471 B2
(45) Date of Patent: Jun. 22, 2010

(54) METHODS AND SYSTEMS FOR ROUTING PACKETS WITH A HARDWARE FORWARDING ENGINE AND A SOFTWARE FORWARDING ENGINE

(75) Inventors: Sreedharan Sreejith, Santa Clara, CA (US); Praseeth Sreedharan, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1000 days.

(21) Appl. No.: 11/289,749

(22) Filed: Nov. 29, 2005

(65) Prior Publication Data

US 2007/0121616 A1    May 31, 2007

(51) Int. Cl.
*H04L 12/28* (2006.01)
(52) U.S. Cl. .................. 370/389; 370/469; 370/475; 370/902; 709/238
(58) Field of Classification Search ............... 370/389, 370/469, 475, 902; 709/238
See application file for complete search history.

(56) References Cited

U.S. PATENT DOCUMENTS

| | | | |
|---|---|---|---|
| 6,847,645 B1 * | 1/2005 | Potter et al. ............... 370/392 |
| 6,990,103 B1 * | 1/2006 | Gollamudi ............. 370/395.31 |
| 7,006,431 B1 * | 2/2006 | Kanekar et al. ............ 370/217 |
| 2002/0172155 A1 * | 11/2002 | Kasvand-Harris et al. ... 370/229 |
| 2003/0152075 A1 * | 8/2003 | Hawthorne et al. ........ 370/389 |
| 2004/0013103 A1 * | 1/2004 | Zhang et al. ............. 370/345 |
| 2004/0052251 A1 * | 3/2004 | Mehrotra et al. ........... 370/389 |
| 2004/0230686 A1 * | 11/2004 | Thomas et al. ............ 709/228 |

OTHER PUBLICATIONS

Sreedharan, Sreejith, "Methods and Systems for Policy Based Routing," Filing Date—Nov. 29, 2005, U.S. Appl. No. 11/288,845, Specification (25 pgs.) and Drawings (7 sheets).

\* cited by examiner

*Primary Examiner*—Pankaj Kumar
*Assistant Examiner*—Lonnie Sweet (57) ABSTRACT

A system is provided that includes a hardware forwarding engine that routes data packets. The system also comprises a processor coupled to the hardware forwarding engine, the processor having a software forwarding engine that routes data packets. If data packets are forwarded from the hardware forwarding engine to the software forwarding engine, the hardware forwarding engine provides route lookup results for at least some of the data packets forwarded to the software forwarding engine.

20 Claims, 5 Drawing Sheets

METHODS AND SYSTEMS FOR ROUTING PACKETS WITH A HARDWARE FORWARDING ENGINE AND A SOFTWARE FORWARDING ENGINE

CROSS-REFERENCE TO RELATED APPLICATIONS

This application is related to U.S. patent application Ser. No. 11/288,845, entitled "Methods and Systems for Policy Based Routing", filed on even date herewith, by Sreedharan Sreejith, which is incorporated herein by reference.

STATEMENT REGARDING FEDERALLY SPONSORED RESEARCH OR DEVELOPMENT

Not applicable.

REFERENCE TO A MICROFICHE APPENDIX

Not applicable.

FIELD OF THE INVENTION

The present disclosure is directed to communication networks, and more particularly, but not by way of limitation, to routers that implement a hybrid (hardware and software) forwarding architecture.

BACKGROUND OF THE INVENTION

Modern communication networks are tasked with transferring large amounts of data between different computers such as servers and clients. To transfer the data, communication parameters are established such as the format of the data to be transferred, the speed and bandwidth with which the data is sent, the source of the data, and the destination of the data. By the time the data has been transferred from its source location to its destination, the data may have passed through several routers and may have changed its format several times. The speed with which routers are able to process and forward the data affects the overall data transfer rate of a communication network. Typically, a higher data transfer rate is preferred by industry and consumers.

SUMMARY OF THE INVENTION

In at least some embodiments, a system comprises a hardware forwarding engine that routes data packets. The system also comprises a processor coupled to the hardware forwarding engine, the processor having a software forwarding engine that routes data packets. If data packets are forwarded from the hardware forwarding engine to the software forwarding engine, the hardware forwarding engine provides route lookup results for at least some of the data packets forwarded to the software forwarding engine.

In at least some embodiments, a method comprises performing, by a hardware forwarding engine, a route lookup process to determine a route associated with a data packet. If a next hop of the data packet is a processor interface, the method further comprises encapsulating the data packet in a first tunnel header that includes a result of the route lookup process.

In at least some embodiments, a routing system comprises a hardware forwarding engine that routes data packets received from a network interface. The routing system also comprises a processor coupled to communicate with the hardware forwarding engine, the processor having a software forwarding engine that routes data packets received from a processor interface. If a packet received from the network interface is destined for the processor interface, the hardware forwarding engine performs a route lookup, inserts a route lookup result into a tunnel header associated with the data packet, and forwards the tunnel header and the original data packet to the processor. The software forwarding engine is configured to extract the route lookup result from the tunnel header and to route the data packet based on the route lookup result.

BRIEF DESCRIPTION OF THE DRAWINGS

For a more complete understanding of the present disclosure and the advantages thereof, reference is now made to the following brief description, taken in connection with the accompanying drawings and detailed description, wherein like reference numerals represent like parts.

NOTATION AND NOMENCLATURE

Certain terms are used throughout the following description and claims to refer to particular system components. As one skilled in the art will appreciate, computer companies may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean either an indirect, direct, optical, wireless, or other electrical connection. Thus, if a first device couples to a second device, that connection may be through a direct electrical connection, through an indirect electrical connection via other devices and connections, through an optical electrical connection, or through a wireless or other electrical connection, for example.

DETAILED DESCRIPTION OF THE PREFERRED EMBODIMENTS

It should be understood at the outset that although an exemplary implementation of one embodiment of the present disclosure is illustrated below, the present system may be implemented using any number of techniques, whether currently known or in existence. The present disclosure should in no way be limited to the exemplary implementations, drawings, and techniques illustrated below, including the exemplary design and implementation illustrated and described herein, but may be modified within the scope of the appended claims along with their full scope of equivalents.

Embodiments of the disclosure forward data packets in a communication network. In some embodiments, routers forward data packets based on the Internet Protocol (IP) version 4 (IPv4) and/or the Internet Protocol version 6 (IPv6). IPv4 uses 32-bit addresses and is limited to 4,294,967,296 unique addresses. IPv6 is intended to address the concern of IPv4 address exhaustion and uses 128-bit addresses. To ensure backwards compatibility, IPv4 addresses can be converted into IPv6 addresses.

In some embodiments, routers implement a "hybrid" architecture that has a hardware forwarding engine and a software forwarding engine. The hardware forwarding engine routes packets for high-speed interfaces such as "gigabit" links using custom hardware. The software forwarding engine routes packets for lower speed interfaces such as "T1" or "T3" links using a CPU.

Figure 1:
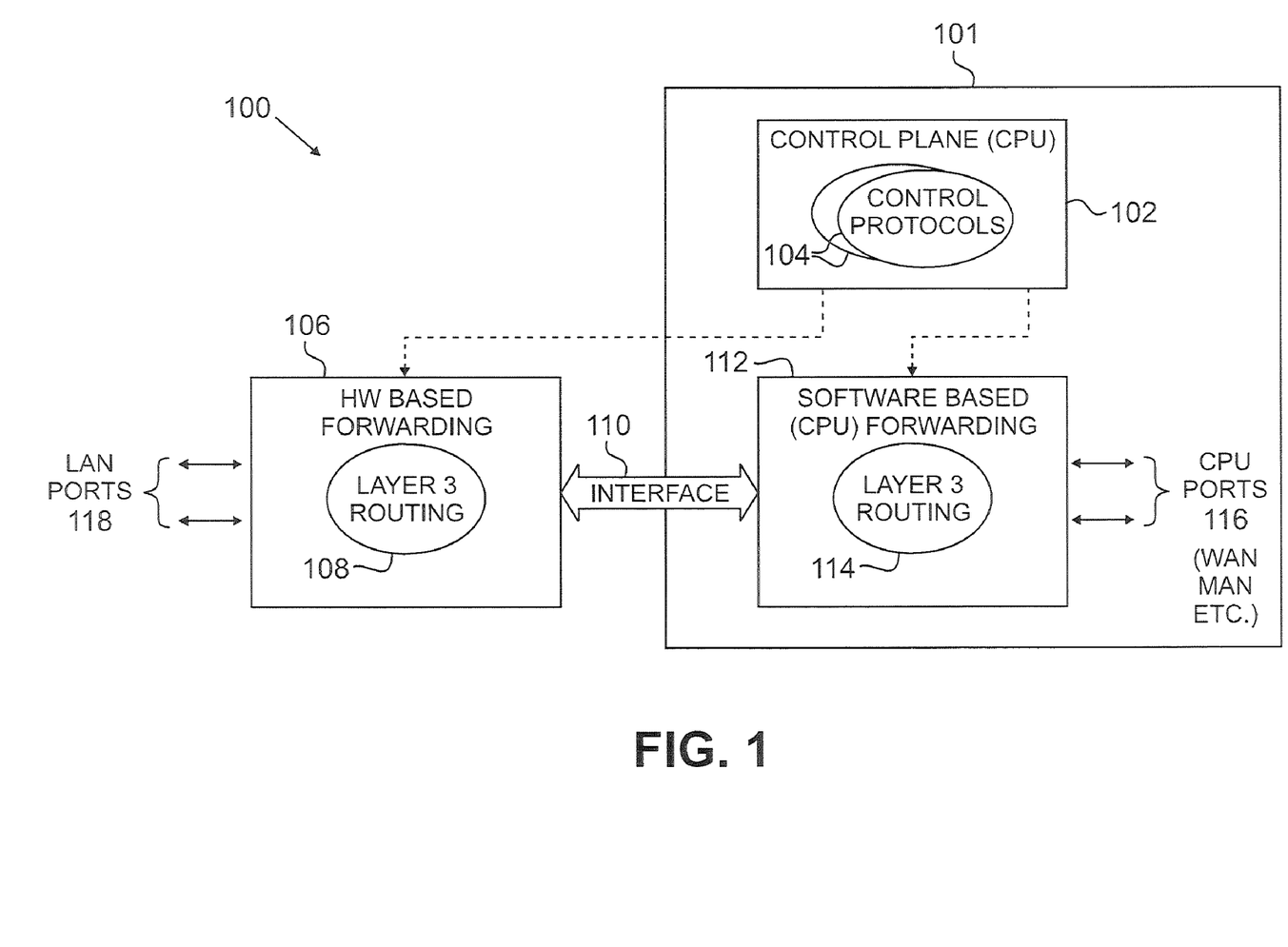
FIG. 1 illustrates a routing architecture in accordance with some embodiments of the disclosure.

FIG. 1 illustrates a routing architecture 100 in accordance with embodiments of the disclosure. As shown in FIG. 1, the routing architecture 100 comprises a hardware (HW) forwarding engine (FE) 106 coupled to a central processing unit (CPU) 101. The CPU 101 comprises a software (SW) forwarding engine (FE) 112 as well as a control plane 102 having one or more control protocols 104. The control protocols 104 establish how the HW FE 106 and the SW FE 112 handle data packets received from ports such as Local Area Network (LAN) ports 118 or CPU ports 116 (e.g., Wide Area Network (WAN) ports or Metropolitan Area Network (MAN) ports). As shown, in some embodiments, the HW FE 106 interfaces with the LAN ports 118 and the SW FE 112 interfaces with the CPU ports 116.

The HW FE 106 and the SW FE 112 are coupled via an interface 110 such as an Ethernet interface or some other communication interface. As shown, the HW FE 106 comprises a Layer 3 ("L3") routing component 108, which receives incoming packets from the LAN ports 118 and routes the packets based on one or more routing techniques. In some embodiments, the component 108 determines where to route packets based on a route lookup process that involves searching a database (or table) of routes (i.e., a plurality of routes are indexed in the database). The database may be searched using a Longest Prefix Match (LPM) algorithm or other techniques until a packet's outgoing interface (i.e., the next hop) has been determined.

If the CPU 101 is the next hop, the component 108 transmits the packet as well as the route lookup results to the CPU 101. Providing the route lookup results increases the routing efficiency of the CPU's SW FE 112 by enabling the SW FE 112 to route packets without performing an entire route lookup process. For example, the route lookup results may be an index value (pointer) for directly accessing a route entry in a database or route lookup table available to the SW FE 112. The HW FE 106 as part of the routing process has already performed Time-To-Live (TTL) decrements and header error checksum (HEC) recalculations, so the SW FE 112 can route the packets without the need to perform these steps. Accordingly, the CPU 101 is able to perform other operations that increase the efficiency of the routing architecture 101.

Similar to the HW FE 106, the SW FE 112 comprises a Layer 3 ("L3") routing component 114 configured to receive data packets and route the data packets based on one or more routing techniques. If the L3 routing component 114 does not receive route lookup results from the HW FE 106, the L3 routing component 114 is configured to perform a route lookup process as described previously (i.e., by searching a database of routes to determine a packet's outgoing interface). If the L3 routing component 114 receives route lookup results from the HW FE 106, the L3 routing component 114 forwards the associated packet to its next hop based on the route lookup results without performing the entire route lookup process.

Figure 2:
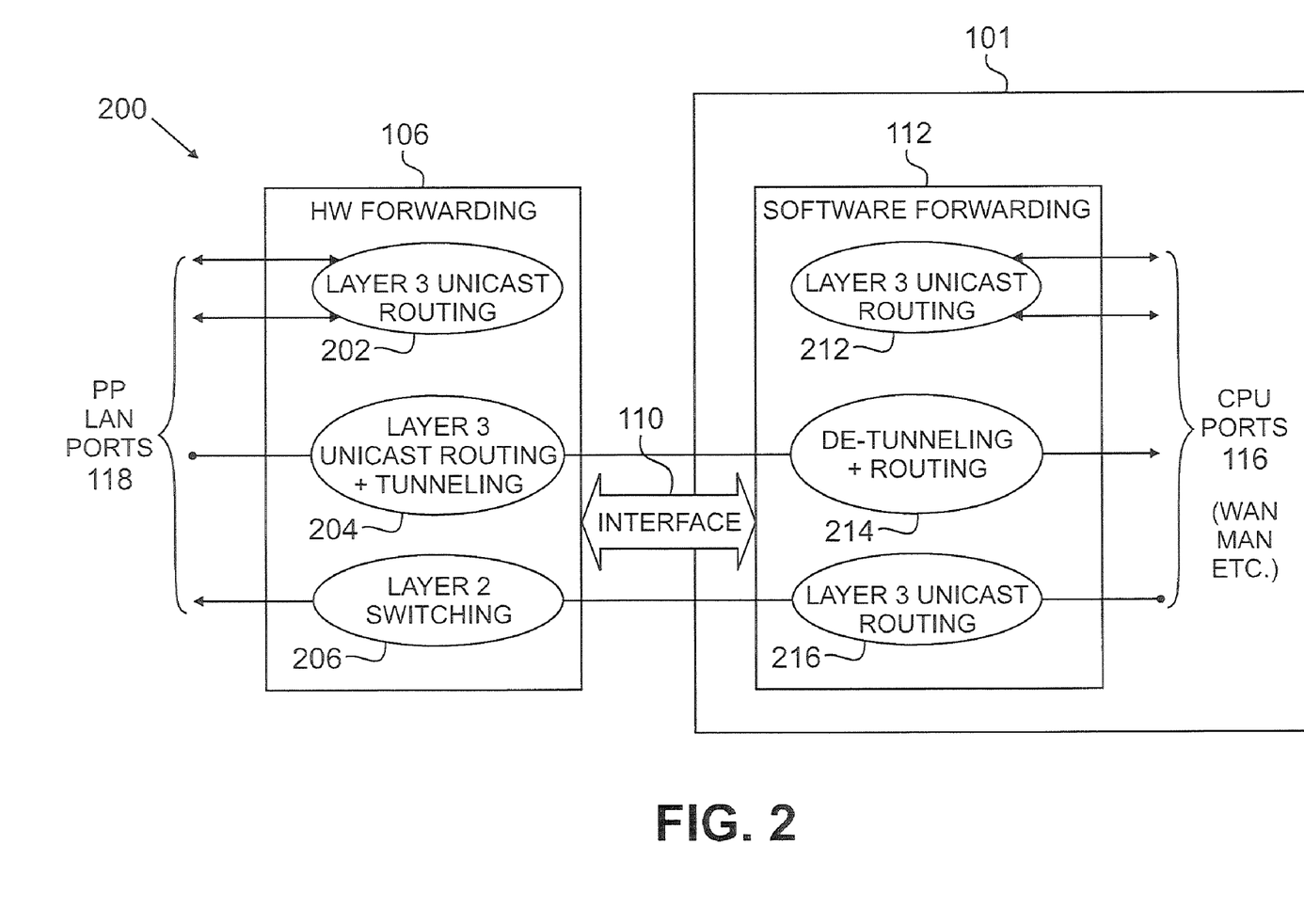
FIG. 2 illustrates a block diagram of the routing architecture of FIG. 1 in accordance with embodiments of the disclosure.

FIG. 2 illustrates a block diagram of the routing architecture 100 of FIG. 1 in accordance with embodiments of the disclosure. In FIG. 2, the traversal of data packets through the HW FE 106 and/or the SW FE 112 of the CPU 101 is shown. As shown, the HW FE 106 comprises a L3 unicast routing component 202, a L3 unicast routing and tunneling component 204 and a L2 switching component 206. The L3 unicast routing component 202 is configured to receive packets from the LAN ports 118 and to route packets back to the LAN ports 118. The unicast routing and tunneling component 204 is configured to receive packets from the LAN ports 118 and to route packets to the CPU 101. When a packet is routed to the CPU 101, the unicast routing and tunneling component 204 adds a tunnel header that includes the packet's route lookup results. The L2 switching component 206 is configured to receive packets from the CPU 101 and route the packets to the LAN ports 118.

As shown, the SW FE 112 comprises a first L3 unicast routing component 212, a de-tunneling and routing component 214, and a second L3 unicast routing component 216. The first L3 unicast routing component 212 is configured to receive packets from the CPU ports 116 and to route packets back to the CPU ports 116. The de-tunneling and routing component 214 is configured to de-tunnel packets received from the HW FE 106 and to route packets based on the route lookup results provided with the packets (e.g., in a packet's tunnel header). The second L3 unicast routing component 216 is configured to receive packets from the CPU ports 116 and to route the packets to the HW FE 106 (e.g., to the L2 switching component 206), which forwards the packets to the LAN ports 118.

Figure 3:
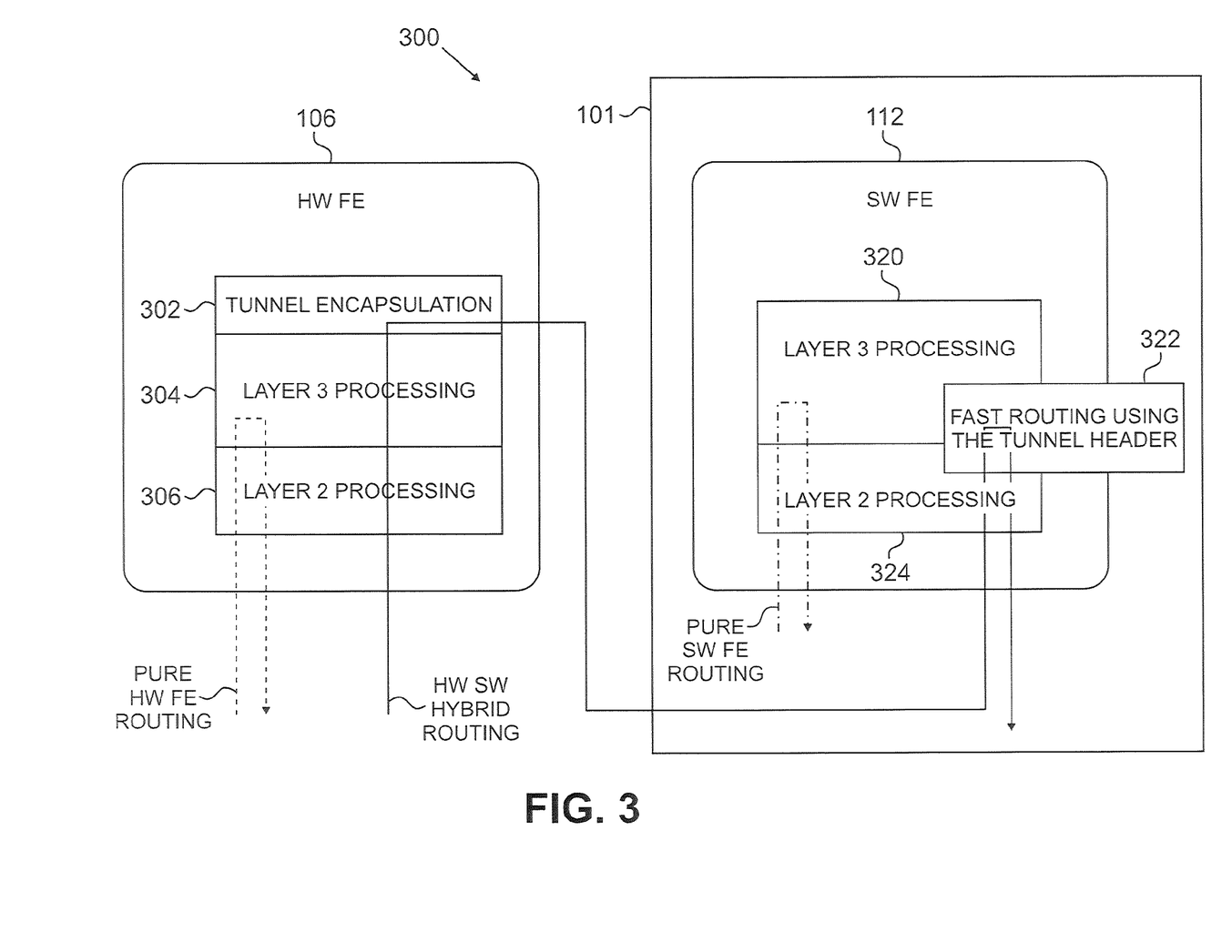
FIG. 3 illustrates packet traversal through various functional layers of a routing architecture in accordance with embodiments of the disclosure.

FIG. 3 illustrates packet traversal through various functional layers of a routing architecture 300 in accordance with embodiments of the disclosure. As shown in FIG. 3, the HW FE 106 and the SW FE 112 are each shown with various functional layers. For example, in some embodiments, the FIW FE 106 comprises a Layer2 ("L2") processing layer 306, a Layer3 ("L3") processing layer 304 and a tunnel encapsulation layer 302. Also, the SW FE 112 comprises a L2 processing layer 324, a L3 processing layer 320 and a fast routing layer 322.

In FIG. 3, a "pure" HW FE routing operation (i.e., an operation that involves the HW FE 106, but not the SW FE 112), a "pure" SW FE routing operation (i.e., an operation that involves the SW FE 112, but not the HW FE 106), and a HW SW hybrid routing operation (i.e., an operation that involves both the HW FE 106 and the SW FE 112) are shown. In a pure HW FE routing operation, data packets are received by the L2 processing layer 306, which processes the incoming packets based on L2 header information. After L2 processing, the L3 processing layer 304 performs a route lookup process and routes each packet to its next hop using, for example, the IPv4 protocol and/or the IPv6 protocol. In a pure HW FE routing operation, packets are forwarded from the L3 processing layer 304 to the L2 processing layer 306, which adds a L2 header to each packet and forwards the packets to an interface attached to the HW FE 106 (e.g., the LAN ports 118).

If a packet's next hop resides in the CPU 101 (e.g., the CPU ports 116), the HW SW hybrid routing operation is performed. In the hybrid routing operation, the tunnel encapsulation layer 302 of the HW FE 106 receives packets intended for the CPU 101 and provides a tunnel header that includes route lookup results from the HW FE 106. In some embodiments, the tunnel encapsulation layer 302 provides the route lookup results (e.g., an index value or pointer) in a tunnel header's source address data field and/or destination address data field. The tunnel header may be for, example, a L3 tunnel header. In some embodiments, the tunnel encapsulation layer 302 also adds an additional tunnel header (e.g., an L2 tunnel header) that distinguishes packets having the route lookup results from other packets. For example, the destination media access control (DMAC) data field of the L2 header can store data (e.g., a signature) to identify which packets include route lookup results. After the tunnel encapsulation layer 302 encapsulates a packet with the tunnel headers, the encapsulated packet is forwarded to the SW FE 112 of the CPU 101.

At the SW FE 112, the L2 processing layer 324 receives encapsulated packets from the HW FE 106 and determines which packets have the route lookup results. For example, in some embodiments, the L2 processing layer 324 extracts data from the DMAC data field of the L2 header to identify packets that include route lookup results (e.g., a predetermined signature can be detected to identify packets with route lookup results). Packets that include route lookup results are forwarded to the fast routing layer 322 which uses the route lookup results to route packets without performing the entire route lookup process. In some embodiments, the route lookup results comprise a route entry index number or pointer that enables the fast routing layer 322 to directly determine a packet's route without having to search a table or database of routes entries.

In a pure SW FE routing operation, data packets are received by the L2 processing layer 324, which processes the incoming packets based on L2 header information. After L2 processing, the L3 processing layer 320 performs a route lookup and routes each packet to its next hop using, for example, the IPv4 protocol and/or the IPv6 protocol. In a pure SW FE routing operation, packets are forwarded from the L3 processing layer 320 to the L2 processing layer 324, which adds a L2 header to each packet and forwards the packets to an interface attached to the SW FE 106 (e.g., the CPU ports 116).

Figure 4:
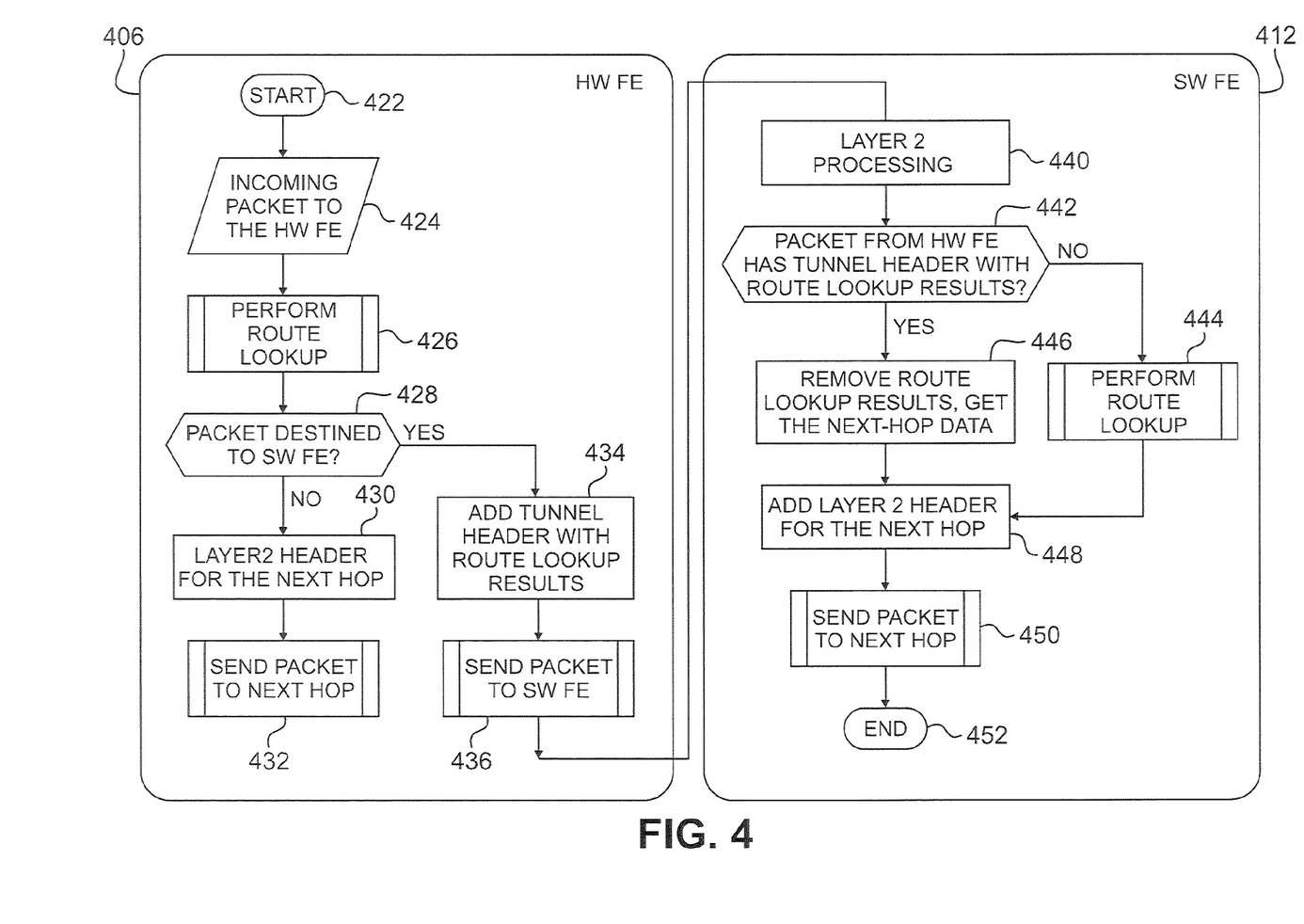
FIG. 4 illustrates flowcharts for a hardware forwarding engine and a software forwarding engine in accordance with embodiments of the disclosure.

FIG. 4 illustrates flowcharts for a hardware forwarding engine (HW FE) process and a software forwarding engine (SW FE) process in accordance with embodiments of the disclosure. As shown in FIG. 4, a process performed by the HW FE 406 starts at block 422. At block 424, an incoming packet is received by the HW FE 406. A route lookup is then performed at block 426. In some embodiments, the route lookup is based on longest prefix match (LPM) routing or some other L3 routing process. If a packet is not destined for the SW FE 412 (determination block 428), the HW FE 406 adds a L2 header to the packet (block 430) and the packet is sent to the next hop (block 432).

If a packet is destined for the SW FE 412 (determination block 428), a tunnel header with the route lookup results is added to the packet (block 434). In some embodiments, a L3 tunnel header (having the route lookup results) and a L2 tunnel header (having a predetermined signature to identify packets with route lookup results) are added to a packet at block 434. The packet is then sent to the SW FE 412 (block 436).

As shown, the SW FE 412 performs L2 processing of packets received from the HW FE 406 at block 440. If a packet from the HW FE 406 does not have a tunnel header with route lookup results (determination block 442), the SW FE 412 performs a route lookup process (block 444). In the route lookup process, the SW FE 412 searches a table or database of route entries until a next hop is determined (e.g., using longest prefix match (LPM) routing). A L2 header is then added for the next hop (block 448) and the packet is sent to the next hop (block 450) which ends the process (block 452).

Alternatively, if a packet from the HW FE 406 has a tunnel header with route lookup results (determination block 442), the SW FE 412 uses the route lookup results to directly determine the packet's next hop and removes the route lookup results (block 446). For example, if the route lookup results provide a pointer (corresponding to a route entry table or database), the SW FE 412 can directly determine the packet's next hop using the pointer. After block 446, a L2 header is added for the next hop (block 448) and the packet is sent to the next hop (block 450) ending the process (block 452).

Figure 5:
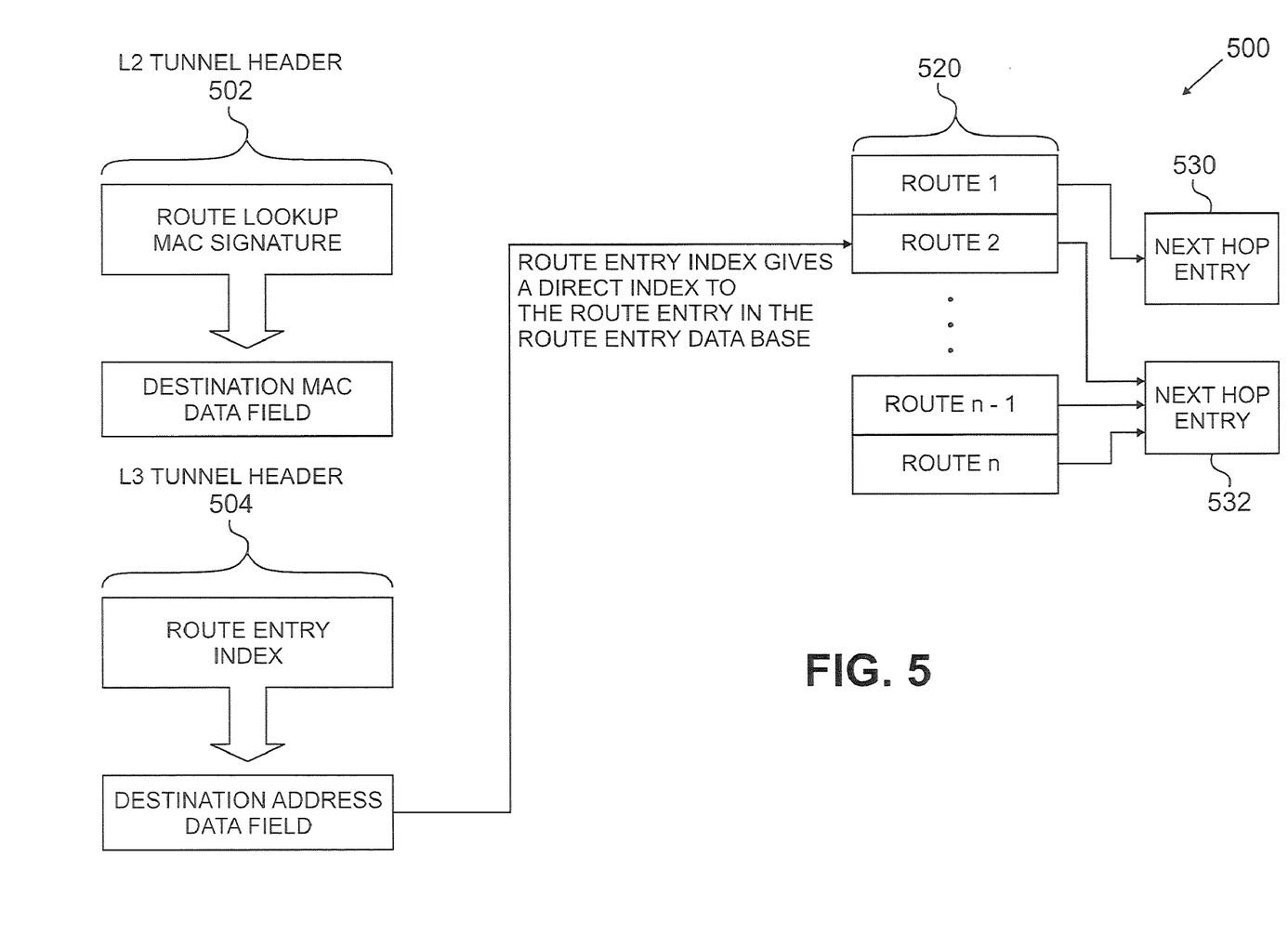
FIG. 5 illustrates an encoding scheme in accordance with embodiments of the disclosure.

FIG. 5 illustrates an encoding scheme 500 in accordance with embodiments of the disclosure. The encoding scheme 500 may be implemented, for example, with the embodiments illustrated in FIGS. 1, 2, 3, and 4. As shown, the encoding scheme 500 comprises a L2 tunnel header with a route lookup media access control (MAC) signature 502. For example, in some embodiments, a destination MAC (DMAC) data field of the L2 tunnel header can be modified to include the route lookup MAC signature 502. The signature 502 enables a SW FE to identify packets that include route lookup results (e.g., an index number or pointer).

The encoding scheme 500 also comprises a L3 tunnel header with the route entry index number (or pointer) 504. In some embodiments, the route entry index number is inserted into a destination address data field of the L3 tunnel header. Additionally or alternatively, the route entry index number is inserted into a source address data field of the L3 tunnel header. The route entry index number 504 gives a direct index to routes 520 in a route entry database. Each of the routes ("route 1" to "route n") 520 is associated with one of a plurality of next hop entries 530 and 532. For example, the route 1 may be associated with the next hop entry 530, while route 2 to route n are associated with the next hop entry 532. The encoding scheme 500 enables a SW FE to route packets directly without performing an entire route lookup process (i.e., the SW FE relies on the route lookup process performed by a HW FE). Also, the SW FE does not need to perform TTL decrements or header error checksum (HEC) recalculations. Accordingly, a CPU associated with the SW FE operates more efficiently (i.e., CPU clock cycles can be allocated to other operations).

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein, but may be modified within the scope of the appended claims along with their full scope of equivalents. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as directly coupled or communicating with each other may be coupled through some interface or device, such that the items may no longer be considered directly coupled to each other but may still be indirectly coupled and in communication, whether electrically, mechanically, or otherwise with one another. Other examples of changes, substitutions, and alterations are ascertainable by one skilled in the art and could be made without departing from the spirit and scope disclosed herein.

What is claimed is:

1. A system, comprising:
   a hardware forwarding engine that routes data packets; and
   a processor coupled to the hardware forwarding engine, the processor having a software forwarding engine that routes data packets,
   wherein, if data packets are forwarded from the hardware forwarding engine to the software forwarding engine, the hardware forwarding engine provides route lookup results for at least some of the data packets forwarded to the software forwarding engine.

2. The system of claim 1 wherein the route lookup results comprise a mute entry index value that enables the software forwarding engine to directly lookup a route from a mute entry database.

3. The system of claim 1 wherein the hardware forwarding engine provides the mute lookup results in a Layer 3 ("L3") tunnel header.

4. The system of claim 3 wherein the hardware forwarding engine provides the mute lookup results in a destination address data field of the L3 tunnel header.

5. The system of claim 3 wherein the hardware forwarding engine provides the route lookup results in a source address data field of the L3 tunnel header.

6. The system of claim 1 wherein the hardware forwarding engine provides another tunnel header having a signature, the signature enables the software forwarding engine to identify packets that include route lookup results.

7. The system of claim 6 wherein the hardware forwarding engine provides the signature in a Layer 2 ("L2") tunnel header.

8. The system of claim 7 wherein the hardware forwarding engine provides the signature in a destination media access control data field of the L2 tunnel header.

9. The system of claim 1 wherein the software forwarding engine does not perform time-to-live decrements for packets that include the route lookup results.

10. The system of claim 1 wherein the software forwarding engine does not perform header error checksum (HEC) recalculations for packets that include the route lookup results.

11. A method, comprising:
    performing, by a hardware forwarding engine, a route lookup process to determine a route associated with a data packet;
    if a next hop of the data packet is a processor interface, encapsulating the data packet in a first tunnel header that includes a result of the route lookup process; and
    forwarding, by the hardware forwarding engine, the result of the route lookup process along with the data packet to a software forwarding engine.

12. The method of claim 11 wherein the result comprises a route entry index value associated with a route entry database.

13. The method of claim 11 further comprising extracting, by the software forwarding engine, the result from the first tunnel header and using the result to route the data packet to the processor interface.

14. The method of claim 11 further comprising encapsulating the data packet in a second tunnel header having a signature, the signature indicates that the first tunnel header includes the result.

15. The method of claim 14 further comprising inserting the signature in a destination media access control (DMAC) data field of the second tunnel header.

16. The method of claim 11 further comprising inserting the result in a destination address data field of the first tunnel header.

17. The method of claim 11 further comprising inserting the result in source address data field of the first tunnel header.

18. A routing system, comprising:
    a hardware forwarding engine that routes data packets received from a network interface; and
    a processor in communication with the hardware forwarding engine, the processor having a software forwarding engine that routes data packets received from a processor interface, such that for a packet received from the network interface destined for the processor interface, the hardware forwarding engine is operable to perform a route lookup, the hardware forwarding engine further operable to insert a route lookup result into a tunnel header associated with the data packet and forward the tunnel header and the data packet to the processor, and further such that the software forwarding engine is operable to extract the route lookup result from the tunnel header and to route the data packet based on the route lookup result.

19. The routing system of claim 18 wherein the hardware forwarding engine encapsulates the tunnel header and the data packet in a second tunnel header having a signature, the signature can be used by the software forwarding engine to identify when the hardware forwarding engine provides the route lookup result.

20. The routing system of claim 19 wherein the signature is inserted into a destination media access control (DMAC) data field of the second tunnel header.

* * * * *

UNITED STATES PATENT AND TRADEMARK OFFICE
CERTIFICATE OF CORRECTION

PATENT NO. : 7,742,471 B2  
APPLICATION NO. : 11/289749  
DATED : June 22, 2010  
INVENTOR(S) : Sreedharan Sreejith et al.

It is certified that error appears in the above-identified patent and that said Letters Patent is hereby corrected as shown below:

Column 7, claim 2, line 16, delete "mute" and replace with --route--;

Column 7, claim 2, line 17, delete "mute" and replace with --route--;

Column 7, claim 3, line 20, delete "mute" and replace with --route--; and

Column 7, claim 4, line 23, delete "mute" and replace with --route--.

Signed and Sealed this  
Twenty-eighth Day of June, 2011

David J. Kappos  
*Director of the United States Patent and Trademark Office*